July 24, 1923.
A. S. THORESEN ET AL
BLOW-OUT PATCH AND TIRE REENFORCER FOR AUTOMOBILE TIRES AND TUBES
1,462,628
Filed April 5, 1922
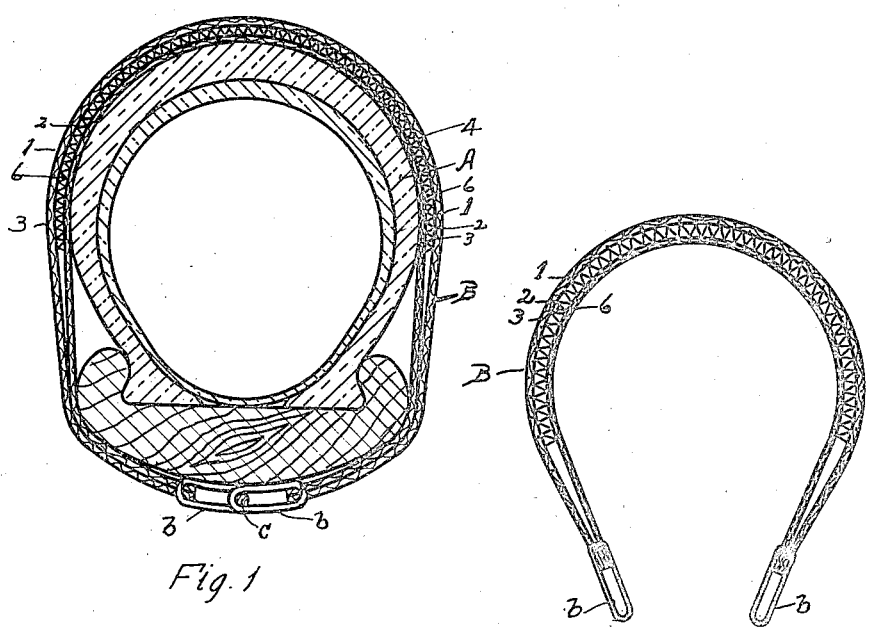
Fig. 1
Fig. 2
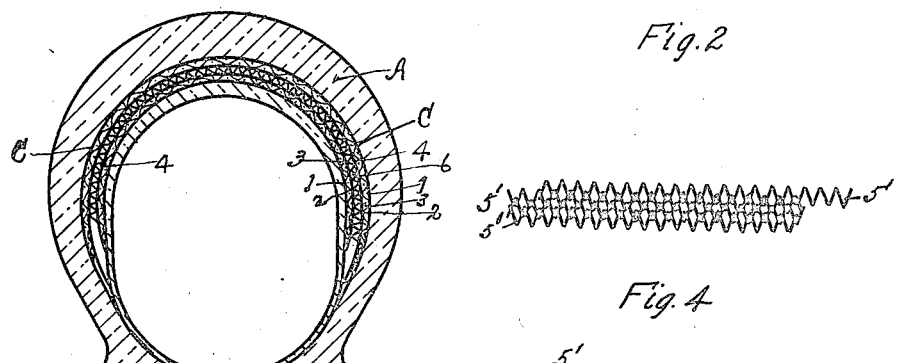
Fig. 3
Fig. 4
Fig. 5
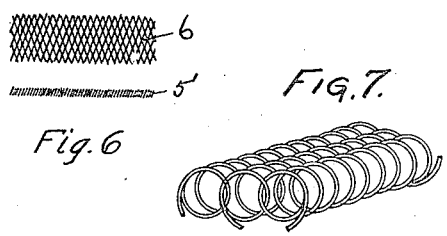
Fig. 6
FIG. 7.
Inventors
Anton S. Thoresen
Felix E. Benoit
Per Henry Marsh Jr.
Attorney Patented July 24, 1923.

1,462,628

UNITED STATES PATENT OFFICE.

ANTON S. THORESEN AND FELIX E. BENOIT, OF NORTH ATTLEBORO, MASSACHUSETTS.

BLOW-OUT PATCH AND TIRE REENFORCER FOR AUTOMOBILE TIRES AND TUBES.

Application filed April 5, 1922. Serial No. 549,692.

*To all whom it may concern:*

Be it known that we, ANTON S. THORESEN and FELIX E. BENOIT, citizens of the United States, residing at North Attleboro, in the county of Bristol and State of Massachusetts, have invented a new and useful Blow-Out Patch and Tire Reenforcer for Automobile Tires and Tubes, of which the following is a specification.

The purpose of our invention is to provide ready, convenient and efficient means for repairing blow-outs or punctures in automobile tires and tubes, and for reinforcing inner tubes and tires.

To these ends our invention consists in the novel and useful construction, combination and arrangement of parts hereinafter described and illustrated in the accompanying drawings, in which, Figure 1 is an elevation showing our invention applied to an automobile tire, the patch being shown in section.

Figure 2 is a sectional view of our blow-out patch.

Figure 3 is a view partly in section showing the application of our invention as a reinforcement to the inner tube of an automobile tire.

Figures 4, 5 and 6 are detail views.

Figure 7 is a greatly enlarged perspective view illustrating the manner of forming the wire mesh from a plurality of spirally wound coils of wire.

Like reference letters and numerals indicate like parts where they occur in the drawings.

In the drawings A represents an automobile tire. B represents our newly invented patch and reenforcer. In constructing this patch B we take strips, as 1 and 2, preferably of insulated or coated fabric, of the requisite width and the required length and between the two we interpose a corresponding sized strip of rubber 3, and compress the three closely together, thereby forming a three fold strip 4. We then take two of the strips 4 and between them interpose a metallic strip 6, and compress the three tightly and compactly together and vulcanize the whole. The free ends of the two strips 4 we then join together and attach to each joined end proper fastening means, as hooks, loops 5, or lacing, to thereby form the blow-out patch. In the drawing we have shown the ends of the strips 4 joined together by a pin or rod c passed through them to secure the patch firmly upon the tire (Fig. 1). In this figure the patch is shown in section. Figure 2 shows the patch (in section) ready for application to a tire.

The metallic strip 6, we form of a plurality of coils of spirally wound wire, said coils disposed side by side with their axes parallel with each other and with the sides of each coil interlocked with the sides of the next adjacent coils by screwing each coil into its adjacent coil, as shown in Figs. 4 and 7, and so continuing until the required width of strip has been formed. By the described means we are enabled to provide a metallic strip of metallic mesh flexible and resilient in all directions, and thus more readily and efficiently attachable to a tire or tube, and less liable to fracture or displacement than other heretofore known forms of wire mesh, and further said mesh being flexible and resilient in all directions a patch having as an interlining a mesh of the form described will more readily accommodate itself to the contour of the tire or tube and therefore will more effectually seal a blow-out or puncture.

When our invention is to be used as a tube or tire reenforcer the ends of the strips 4 are joined, as in Fig. 2, but the fastening means are dispensed with, and the reenforcer B is inserted bodily in the inner tube C as in Fig. 3, or it may be inserted between the tire and tube.

We claim as our invention and desire to secure by Letters Patent:

1. A patch for sealing blow-outs and punctures in automobile tires and tubes, the same consisting of a casing having walls of rubberized fabric, and a metallic member disposed within said casing and composed of a plurality of coils of spirally wound wire arranged with their axes parallel with each other, and each coil screwed into its adjacent coil to thereby form a flexible wire mesh strip, all in combination with each other and with means for securing the whole to a tire or tube.

2. The described blow-out patch and inner tube reenforcer the same consisting of a casing having outer and inner walls of fabric and a metallic insert disposed between said walls composed of spiral coils of wire positioned side by side with the sides of each coil intertwined with the sides of the adjacent coils to thereby form a metallic mesh flexible in all directions, all combined with each other and compressed together and vulcanized into an integral whole.

3. An interlining for a blow-out patch and reenforcer for automobile tires and tubes the same consisting of a metallic strip composed of a plurality of spiral coils of wire disposed side by side with their axes parallel, the sides of each coil interlocked with the sides of its adjacent coils to thereby form a metallic mesh flexible and resilient in all directions.

4. The combination with a casing having outer and inner walls of fabric and a metallic flexible net work interlining disposed between said walls and consisting of spiral coils of wire disposed with their sides parallel with each other and with said coils screwed each into its adjacent coils to thereby form a flexible resilient mesh.

ANTON S. THORESEN.
FELIX E. BENOIT.